Clewell & Schatz,
Apple Parer.

Nº 30,667. Patented Nov. 20, 1860.

Witnesses:
L. W. Bendré
C. W. Cowtan

Inventor:
J. Clewell
W. Schatz
Per Munn & Co
Attorneys

UNITED STATES PATENT OFFICE.

J. L. CLEWELL, JR., AND W. F. SCHATZ, OF NAZARETH, PENNSYLVANIA.

APPLE AND POTATO PARER.

Specification of Letters Patent No. 30,667, dated November 20, 1860.

*To all whom it may concern:*

Be it known that we, J. CLEWELL and W. SCHATZ, of Nazareth, in the county of Northampton and State of Pennsylvania, have invented a new and Improved Machine for Paring Apples, Potatoes, and other Fruits and Vegetables; and we do hereby declare that the following is a full, clear, and exact description of the same, reference being had to the annexed drawings, making a part of this specification, in which—

Figure 1:
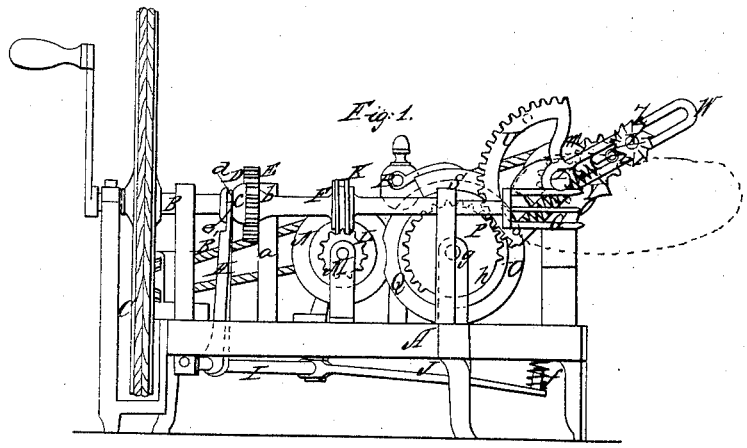
Figure 2:
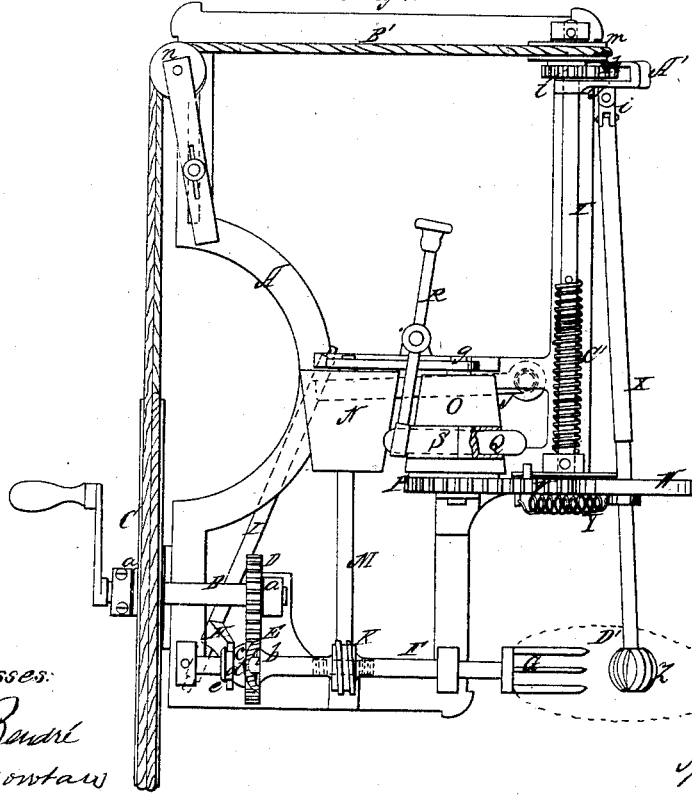

Figure 1 is an end view of our invention in elevation. Fig. 2, a plan or top view of the same.

Similar letters of reference indicate corresponding parts in the two figures.

The object of this invention is to obtain a machine that will pare fruit and vegetables of oblong form and such as have depressions in their surface, as those for instance which contain eyes, as may be seen in potatoes.

The ordinary apple parers will pare fruit of nearly spherical form having a smooth surface but will not pare, without a great waste, fruit or vegetables having an irregular surface and varying very materially in dimensions and from a sphere, an objection which it is believed is fully overcome in our invention.

To enable those skilled in the art to fully understand and construct our invention we will proceed to describe it.

A, represents a horizontal frame which supports the working parts of the machine, and B, is the driving shaft, the bearings of which are on the upper ends of uprights a, a, attached to the frame. On the outer part of the shaft B, there is placed a wheel C, and on the inner part a toothed wheel D, which gears into a corresponding wheel E. The wheel E, is placed on a shaft F, at one end of the frame A, and a fork G, is secured on one end of the shaft F.

The wheel E, is placed loosely on shaft F, and is connected with said shaft by a clutch b. The wheel E, has a hub c, which is provided with a circumferential groove d, in which the fork e, of a lever H, fits. The lower end of this lever H, is attached to a shaft I, which is at the under side of the frame A, and has a lever J, secured to it, said lever having a spiral spring f, bearing on it outer end, which spring has a tendency to keep the wheel E, in gear or in connection with the shaft F, as will be fully understood by referring to Fig. 1.

The shaft F, has a screw K, on it, into which screw a worm wheel L, on a shaft M, gears. This shaft M, has a frustum of a cone N, on its inner end, the smaller end of said frustum being toward the worm wheel L.

O, is a frustum of a cone, the shaft g, of which is parallel with the shaft M. On the shaft g, there is placed a wheel P, having a portion of its periphery smooth or free from teeth as shown at h, in Fig. 1. The frustum of a cone O, is placed in a reverse position to the frustum N, and the latter has an elastic ring or band Q on it, which ring or band may be moved back and forth and adjusted at any desired point on its frustum N, by a rod R, and cap S, the latter fitting over the upper part of the ring or band and having the rod R, attached to it.

T, is a shaft which is parallel with the axes or shafts of the frustums of cones N, O, and has a toothed segment U, at one end of it, said segment having a slotted arm W, through which a shaft X, passes.

Y, is a spring one end of which is attached to shaft T, and the opposite end to the toothed segment U.

The outer end of shaft X, has a spherical cutter Z, on it. This cutter may be described as being of "bun-form," a sphere with cutters formed on it in the direction of its axis. The inner end of shaft X is connected by an universal joint i, with a short shaft j, which is in an arm A', which projects from shaft T. On this short shaft j, there is placed a pinion k, which gears into a pinion l, that is placed loosely on the shaft T. The pinion l, has a pulley m, secured to one side of it, and around this pulley a band or rope B', passes, said band passing around guide pulleys n, n, and the wheel C, on shaft B. On the shaft T, there is placed a spiral spring C'.

The operation is as follows: The article D', to be pared is placed on the fork G, the cutter Z, being at its inner end. The shaft B, is then rotated and motion is communicated to the shaft F, and fork G, through the medium of the gearing D, E. The cutter Z, is also simultaneously rotated through the medium of the band B', and gearing $k$, $l$. As the cutter Z, rotates it is fed outward toward the outer end of the article it is paring, in consequence of the wheel P, gearing into the segment U, and the slotted arm W, and universal joint $i$, allows the shaft X, to move and the cutter to adjust itself to the inequalities of the surface of the article D′ to be pared. In case the article D′, has sunken portions that would pass underneath the cutter without being pared if the article D′, rotated with its usual speed, the article D′, is stopped or kept stationary by disconnecting the wheel E, from shaft F, which is done by raising up the outer end of lever J. This admits of the cutter sinking into the recess and paring the indentation or recess perfectly. When the cutter Z, has traveled to the outer end of the article D′, the latter will be fully pared and the toothed portion of the wheel P, will pass the teeth of the segment U, and the cutter Z, and shaft X, will be thrown back to their original position by the spring C′. The spring Y, keeps the cutter Z, on the surface of the article D′, while the latter is being pared.

The elastic ring or band Q, forms the connection between the two frustums of cones N, O, and through them, the ring or band Q, the wheel P, and segment U, the traveling movement is given the knife Z.

It will be seen at once that it is necessary that this traveling movement should be varied in speed according to the diameter of the article to be pared, the larger the diameter the slower the traveling movement of the knife and vice-versa. This result is effected by means of the elastic ring or band Q, which may be moved or shifted on its frustum O, the traveling movement of the cutter being reduced in speed as the band Q, is moved toward the larger end of its frustum, and when moved toward the smaller end of the frustum the reverse is the case.

By this invention potatoes, and other vegetables differing widely in form, and having an irregular surface, may be pared equally as well as apples and other fruit and vegetables having a comparatively regular or even surface and which approach to a spherical form.

We are aware that all the cutters of apple parers have a traveling movement and we do not claim such movement irrespective of the rotary cutter Z, and other concomitant parts, all other cutters on fruit paring machines not having so far as we are aware a rotary motion, but, We do claim as new and desire to secure by Letters Patent—

1. The combination of the rotary fork G, with the traveling and rotary cutter Z, arranged substantially as and for the purposes set forth.

2. In connection with the traveling and rotary cutter Z, and rotary fork G, the sliding or adjustable wheel E. operated through the medium of the levers H, J, and shaft I, for the purpose of stopping the rotation of the article D′, when necessary, to allow the cutter to pass into depressions or sunken places in the surface of said article.

3. The combination of the two frustums of cones N, O, with the adjustable elastic ring or band Q, arranged substantially as shown to vary the speed of the traveling movement of the cutter Z, as circumstances may require.

JACOB L. CLEWELL, JR.
WILLIAM F. SCHATZ.

Witnesses:
JACOB CLEWELL,
J. H. BARHILL.